(12) United States Patent
Okada

(10) Patent No.: US 8,495,865 B2
(45) Date of Patent: Jul. 30, 2013

(54) CONTROL UNIT FOR TURBOCHARGED INTERNAL COMBUSTION ENGINE

(75) Inventor: Yoshihiro Okada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 316 days.

(21) Appl. No.: 13/054,715

(22) PCT Filed: Jul. 16, 2009

(86) PCT No.: PCT/IB2009/006262
§ 371 (c)(1),
(2), (4) Date: Jan. 18, 2011

(87) PCT Pub. No.: WO2010/007512
PCT Pub. Date: Jan. 21, 2010

(65) Prior Publication Data
US 2011/0126519 A1     Jun. 2, 2011

(30) Foreign Application Priority Data

Jul. 18, 2008   (JP) .................................. 2008-187389

(51) Int. Cl.
*F01N 3/00*     (2006.01)
*F01N 3/10*     (2006.01)
*F02B 33/44*    (2006.01)
*F01L 1/34*     (2006.01)

(52) U.S. Cl.
USPC ................ 60/285; 60/276; 60/299; 60/605.1; 123/90.15

(58) Field of Classification Search
USPC .................. 60/276, 280, 285, 299, 301, 602, 60/605.1; 123/90.15
See application file for complete search history.

(56) References Cited

U.S. PATENT DOCUMENTS
2005/0284130 A1   12/2005   Takubo et al.

FOREIGN PATENT DOCUMENTS
| DE | 199 55 090 | 5/2001 |
|---|---|---|
| JP | 10089106 | 4/1998 |
| JP | 2002 526713 | 8/2002 |

OTHER PUBLICATIONS

International Search Report Issued Oct. 15, 2009 in PCT/IB09/006262 filed Jul. 16, 2009.

*Primary Examiner* — Kenneth Bomberg
*Assistant Examiner* — Audrey K Bradley
(74) *Attorney, Agent, or Firm* — Oblon, Spivak, McClelland, Maier & Neustadt, L.L.P.

(57) ABSTRACT

A control unit for a turbocharged internal combustion engine is provided. The control unit includes a first exhaust valve that opens/closes a first exhaust passage that is communicated with a turbine; a second exhaust valve that opens/closes a second exhaust passage that bypasses the turbine; and a closing timing of the second exhaust valve that is controlled so that an opening period of the second exhaust valve overlaps with an opening period of an intake valve under high engine load. The opening characteristic of the second exhaust valve and a fuel injection amount are controlled so that the air-fuel ratio of gas that is filled in a cylinder approximates an output air-fuel ratio and the air-fuel ratio of gas flowing into a three-way catalyst that is arranged in a post-junction exhaust passage approximates a theoretical air-fuel ratio under high engine load.

11 Claims, 8 Drawing Sheets

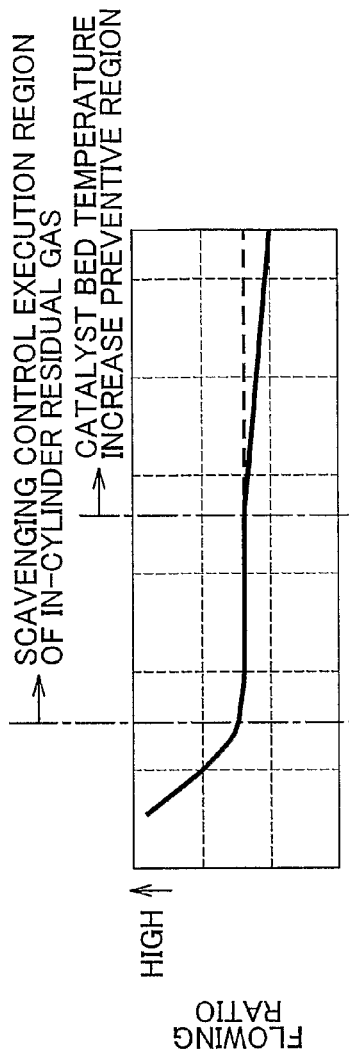
FIG. 6A
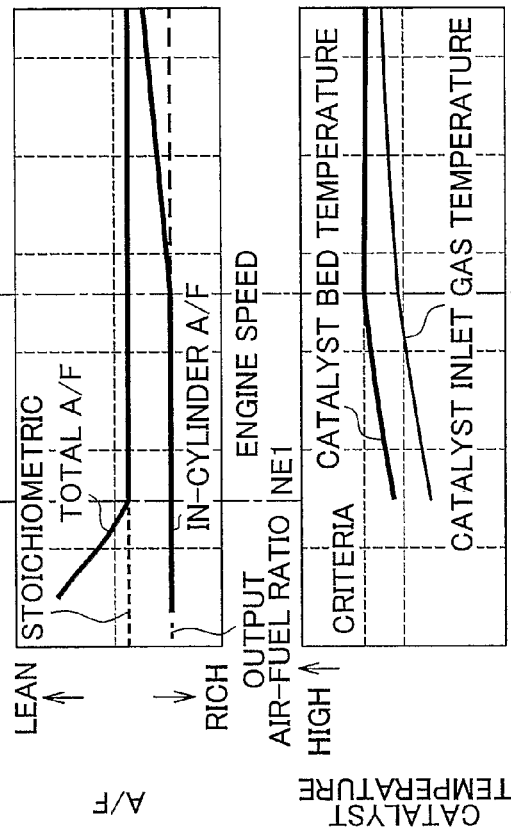
FIG. 6B
FIG. 6C

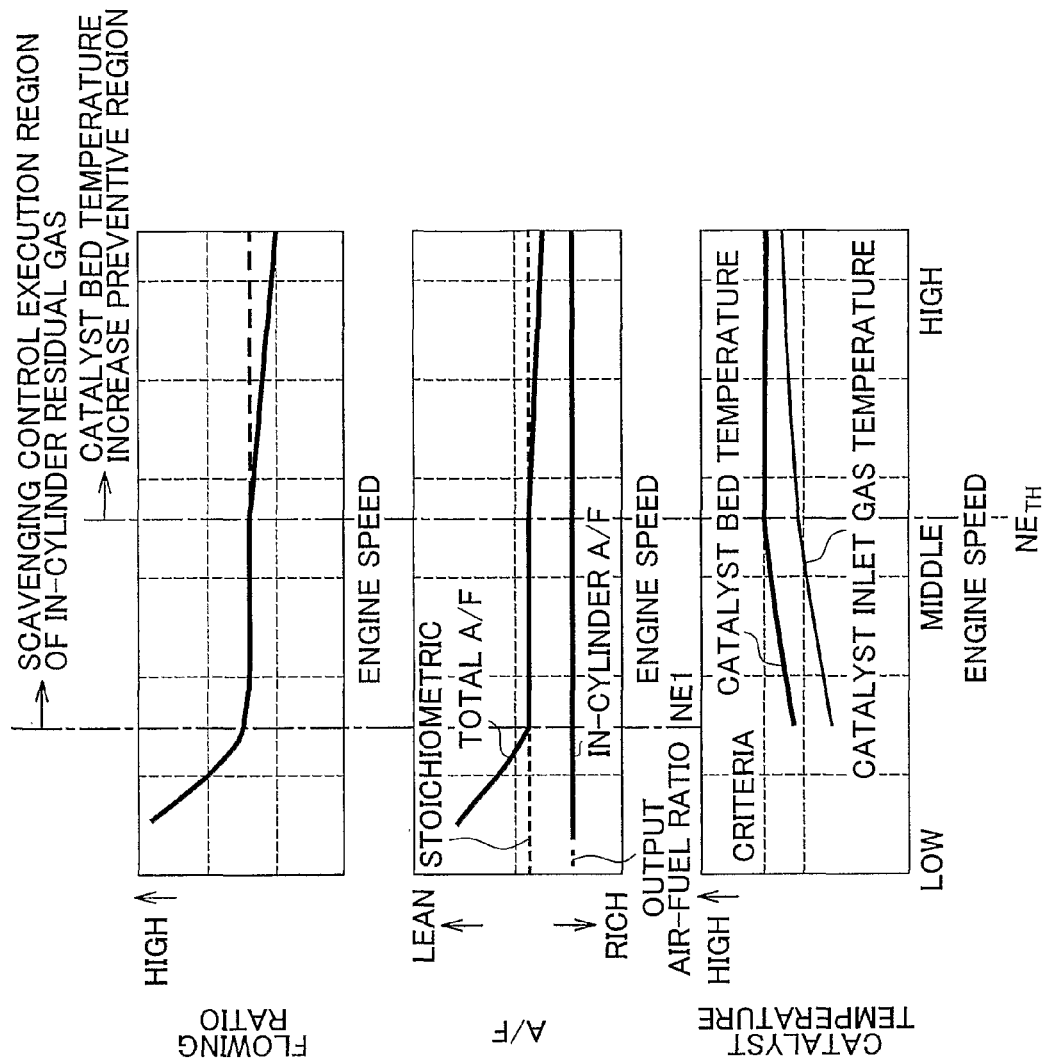

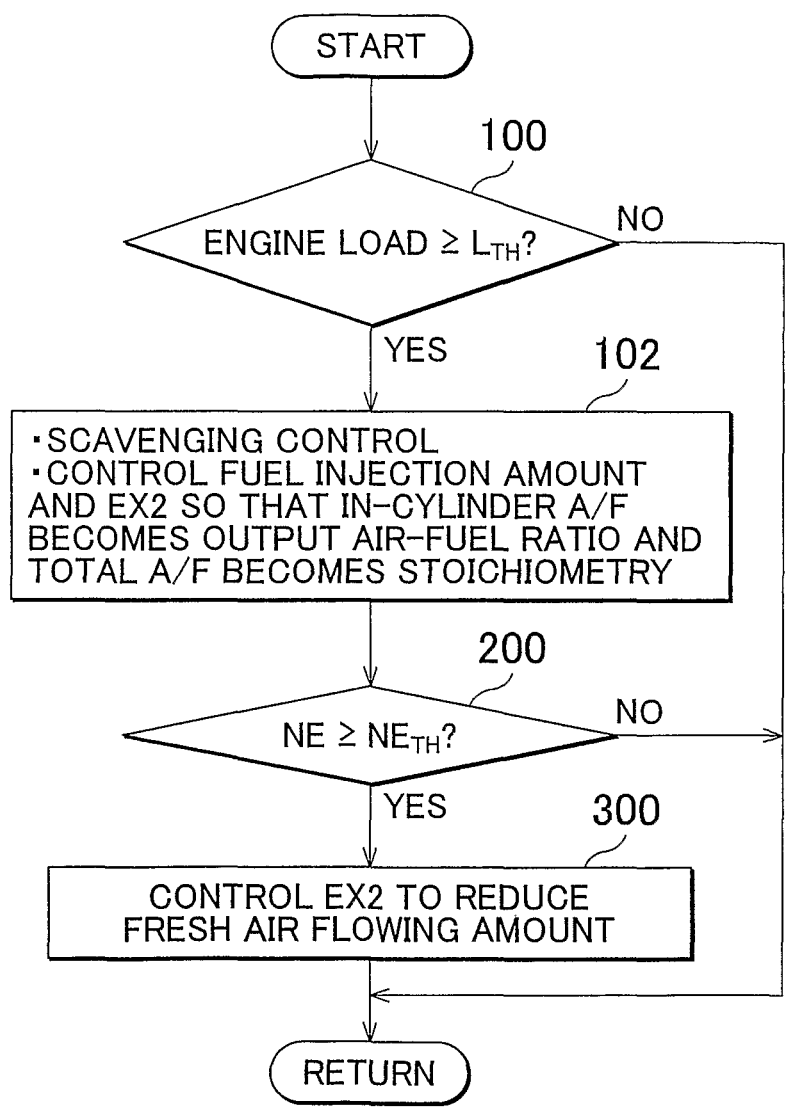

CONTROL UNIT FOR TURBOCHARGED INTERNAL COMBUSTION ENGINE

BACKGROUND OF THE INVENTION

1. Field of the Invention

The present invention relates to a control unit for a turbocharged internal combustion engine.

2. Description of the Related Art

For example, Japanese Patent Application Publication No. 10-89106 (JP-A-10-89106) describes an internal combustion engine that is equipped with a turbocharger (independent exhaust engine). The internal combustion engine described in JP-A-10-89106 includes: a first exhaust valve that opens and closes a first exhaust passage that is communicated with a turbine; and a second exhaust valve that opens and closes a second exhaust passage that bypasses the turbine. In the described internal combustion engine, exhaust energy may be directed to the turbine by opening the first exhaust valve. In addition, exhaust gas may be discharged to bypass the turbine by opening the second exhaust valve; therefore, it is possible to reduce pumping loss that is caused by the exhaust gas.

If there is a valve overlap period is between an opening period of an intake valve and an opening period of an exhaust valve in the internal combustion engine equipped with a turbocharger, this may cause air and fuel to flow from the intake side to the exhaust side through the combustion chamber under high load if the compressed pressure is higher than back pressure. JP-A-10-89106 does not describe an air-fuel ratio control when flowing of the air and fuel occurs.

SUMMARY OF THE INVENTION

The present invention provides a control unit for an internal combustion engine equipped with a turbocharger that simultaneously improves engine output and reduces exhaust emission under high load in the internal combustion engine.

A control unit for a turbocharged internal combustion engine according to the first aspect of the present invention includes: a turbocharger that compresses intake air; a first exhaust passage that is communicated with to a turbine of the turbocharger; a first exhaust valve that opens and closes the first exhaust passage; a second exhaust passage that bypasses the turbine; a second exhaust valve that opens and closes the second exhaust passage; a post-junction exhaust passage after the first exhaust passage and the second exhaust passage are joined together; and a catalyst that is arranged in the post-junction exhaust passage and purifies exhaust gas. The control unit for an internal combustion engine equipped with a turbocharger further includes: scavenging control execution means for controlling at least one of an opening timing of the second exhaust valve and an opening timing of an intake valve so as to secure a valve overlap period in which an opening period of the second exhaust valve and an opening period of the intake valve overlap when the internal combustion engine operates under high load; and air-fuel ratio control means for controlling to bring an air-fuel ratio of gas that is filled in a cylinder to an output air-fuel ratio or a value close to the output air-fuel ratio and controlling to bring the air-fuel ratio of gas flowing into the catalyst to a theoretical air-fuel ratio or a value close to the theoretical air-fuel ratio when internal combustion engine operates under high load.

According to the first aspect, it is possible to maximize the engine output by bringing the air-fuel ratio of gas that is filled in the cylinder (hereinafter referred to as "in-cylinder A/F") to the output air-fuel ratio. In addition, it is possible to obtain a favorable emission characteristic of exhaust gas by bringing the air-fuel ratio of gas that flows into the catalyst (hereinafter referred to as "total A/F") to the theoretical air-fuel ratio. As described above, according to the first aspect, it is possible to simultaneously achieve the improvement in the engine output and the reduction in exhaust emission under high load when the high engine output is required.

In the control unit for a turbocharged internal combustion engine according to the first aspect, the air-fuel ratio control means may include: a first air-fuel ratio sensor that is provided in the first exhaust passage to detect the air-fuel ratio of exhaust gas in the first exhaust passage; a second air-fuel ratio sensor that is provided at least either upstream or downstream of the catalyst in the post-junction exhaust passage to detect the air-fuel ratio of exhaust gas in the post-junction exhaust passage; first air-fuel ratio feedback control execution means for controlling to keep the air-fuel ratio of gas that is filled in the cylinder to the value close to the output air-fuel ratio base on the output of the first air-fuel ratio sensor; and second air-fuel ratio feedback control execution means for controlling to keep the air-fuel ratio of gas flowing into the catalyst to the theoretical air-fuel ratio base on the output of the second air-fuel ratio sensor.

According to the first aspect, it is possible to reliably, not accidentally, keep the in-cylinder A/F to the value close to the output air-fuel ratio, and it is also possible to reliably, not accidentally, keep the total A/F to the value close to stoichiometric during high-load operation of the internal combustion engine.

In the control unit for a turbocharged internal combustion engine according to the first aspect, the first air-fuel ratio feedback control execution means and the second air-fuel ratio feedback control execution means may execute the feedback control to adjust at least one of the fuel injection amount and an opening characteristic of the second exhaust valve.

In the control unit for a turbocharged internal combustion engine according to the first aspect, the first air-fuel ratio feedback control execution means may execute the feedback control to adjust the fuel injection amount. In addition, the second air-fuel ratio feedback control execution means may execute the feedback control to adjust the opening characteristic of the second exhaust valve.

In the control unit for a turbocharged internal combustion engine according to the first aspect, the opening characteristic of the second exhaust valve may be changed based on at least one of a valve timing, the lift, and the duration of the second exhaust valve.

In the control unit for a turbocharged internal combustion engine according to the first aspect, the air-fuel ratio control means may include: air-fuel ratio difference control means for controlling at least one of the air-fuel ratio of gas that is filled in the cylinder and the air-fuel ratio of gas that flows into the catalyst to reduce an air-fuel ratio difference between the air-fuel ratio of gas that is filled in the cylinder and the air-fuel ratio of gas that flows into the catalyst when an engine speed is equal to or higher than a threshold engine speed.

According to the first aspect, even when the air-fuel ratio control that accompanies the scavenging control, which uses the fresh-air flow from the intake side to the exhaust side, under high load is executed, it is possible to suppress combustion of the excessive fuel amount in the catalyst. Therefore, it is possible to favorably prevent the catalyst bed temperature from exceeding an upper limit temperature threshold.

In the control unit for a turbocharged internal combustion engine according to the first aspect, the air-fuel ratio difference control means may include emission priority air-fuel ratio difference control means for adjusting the opening characteristic of the second exhaust valve and the fuel injection amount so that the air-fuel ratio of gas that is filled in the cylinder approximates the air-fuel ratio of gas that flows into the catalyst when the air-fuel ratio difference is reduced.

According to the first aspect, when an air-fuel ratio difference between the in-cylinder A/F and the total A/F is reduced, it is possible to reduce an excessive amount of fuel to be discharged from the cylinder by bringing the in-cylinder A/F close to the total A/F. Accordingly, it is possible to suppress the combustion of the excessive fuel amount in the catalyst. In addition, according to the first aspect, the total A/F is constantly kept at stoichiometric regardless of an increase and a decrease in the engine speed under high load. Therefore, it is possible to prevent an excessive increase in the catalyst bed temperature while the exhaust emission reduction is prioritized over the output improvement.

In the control unit for a turbocharged internal combustion engine according to the first aspect, the air-fuel ratio difference control means may adjust the opening characteristic of the second exhaust valve so as to retain the amount of air that is filled in the cylinder and to reduce the fresh air flowing amount. In addition, the air-fuel ratio difference control means may also adjust the fuel injection amount in proportion to the reduction in the fresh air flowing amount.

In the control unit for a turbocharged internal combustion engine according to the first aspect, the air-fuel ratio difference control means may include output priority air-fuel ratio difference control means for adjusting the opening characteristic of the second exhaust valve so that the air-fuel ratio of gas that flows into the catalyst approximates the air-fuel ratio of gas that is filled in the cylinder, when the air-fuel ratio difference is reduced.

According to the first aspect, when the air-fuel ratio difference between the in-cylinder A/F and the total A/F is reduced, it is possible to reduce the excessive amount of fuel that flows through the cylinder by bringing the total A/F close to the in-cylinder A/F. As described above, because the excessive fresh air amount (oxygen amount) that is used for reaction with the excessive fuel amount in the catalyst is reduced, it is possible to suppress the combustion of the excessive fuel amount in the catalyst. In addition, according to the first aspect, the in-cylinder A/F is constantly kept at the output air-fuel ratio regardless of the increase and the decrease in the engine speed under high load. Therefore, it is possible to prevent the excessive increase in the catalyst bed temperature while the exhaust emission reduction is prioritized over the output improvement.

In the control unit for a turbocharged internal combustion engine according to the first aspect, the air-fuel ratio difference control means may adjust the opening characteristic of the second exhaust valve to reduce the fresh air flowing amount while retaining the amount of air that is filled in the cylinder and the fuel injection amount.

In a control method for a turbocharged internal combustion engine according to a second aspect of the present invention, the turbocharged internal combustion includes: a turbocharger that compresses intake air; a first exhaust passage that is communicated with a turbine of the turbocharger; a first exhaust valve that opens and closes the first exhaust passage; a second exhaust passage that bypasses the turbine; a second exhaust valve that opens and closes the second exhaust passage; a post-junction exhaust passage after the first exhaust passage and the second exhaust passage are joined together; and a catalyst that is arranged in the post-junction exhaust passage and purifies exhaust gas. The control method for a turbocharged internal combustion engine executes: controlling at least one of the closing timing of the second exhaust valve and the opening timing of the intake valve to secure a valve overlap period between the opening period of the second exhaust valve and the opening period of the intake valve when the internal combustion engine operates under high load; and controlling to bring the air-fuel ratio of gas that is filled in the cylinder to the output air-fuel ratio or a value close to the output air-fuel ratio and to bring the air-fuel ratio of gas flowing into the catalyst to the theoretical air-fuel ratio or a value close to the theoretical air-fuel ratio when the internal combustion engine operates under high load.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 6A to FIG. 6C illustrate characteristic control in a second embodiment of the present invention;

FIG. 8A to FIG. 8C illustrate characteristic control in a third embodiment of the present invention; and FIG. 9 is a flowchart of a routine that is executed in the third embodiment of the present invention.

DETAILED DESCRIPTION OF EMBODIMENTS

Figure 1:
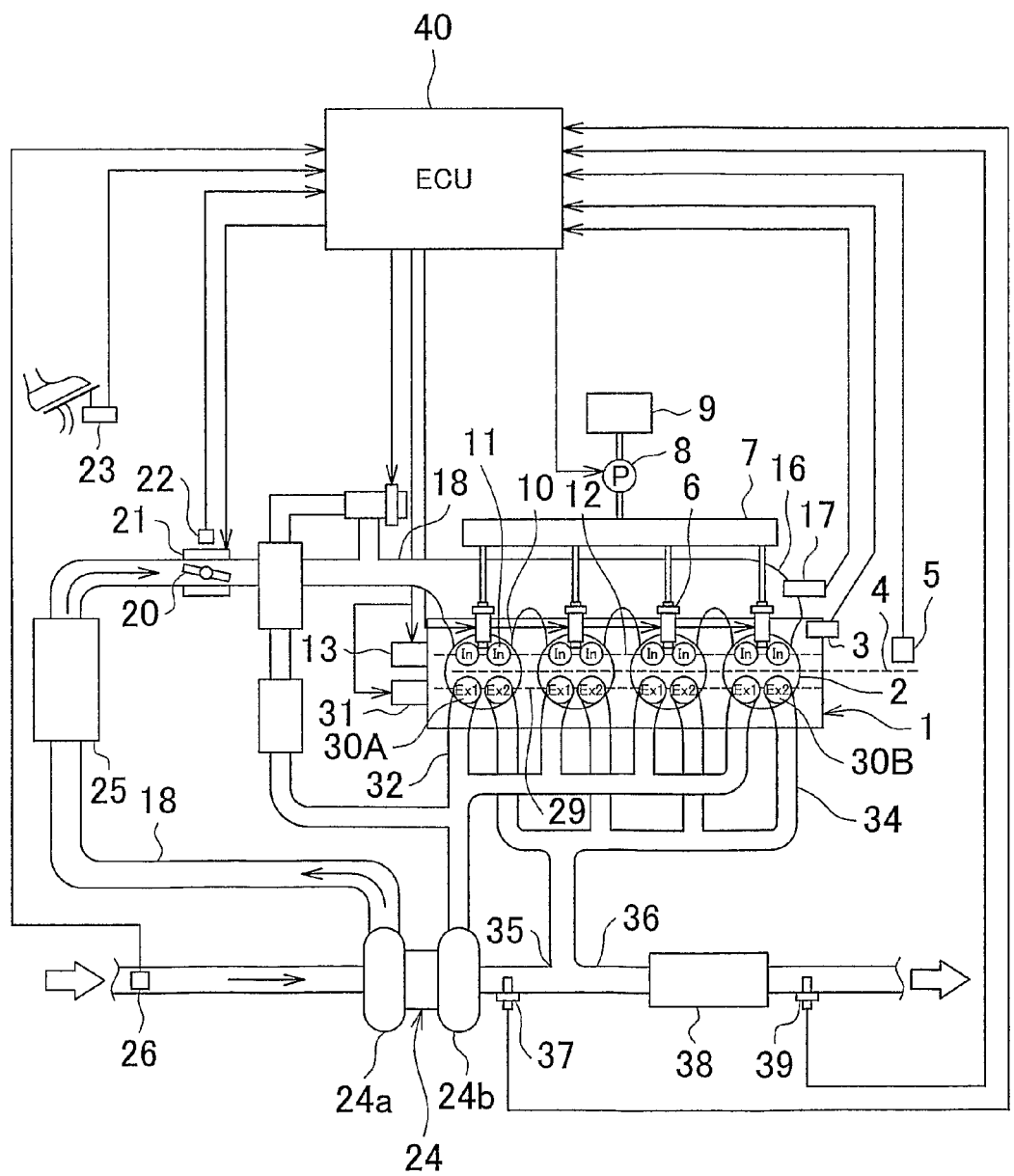
FIG. 1 is a diagram that shows a system configuration according to a first embodiment of the present invention.

FIG. 1 is a diagram that shows a system configuration according to a first embodiment of the present invention. The system of the first embodiment is an independent exhaust engine system with a turbocharger.

The system shown in FIG. 1 includes an engine 1 that has a plurality of cylinders 2. A piston (not shown) in each cylinder 2 is connected to a common crankshaft 4 via a crank mechanism. A crank angle sensor 5 that detects the rotational angle of the crankshaft 4 (crank angle CA) is provided near the crankshaft 4. The engine 1 is also provided with a coolant temperature sensor 3 that detects the coolant temperature Tw.

The engine 1 has an injector 6 for each cylinder 2. The injectors 6 inject high-pressure fuel directly into the cylinders 2. Each injector 6 is connected to a common delivery pipe 7. The delivery pipe 7 communicates with a fuel tank 9 via a fuel pump 8.

Also, the engine 1 has an intake port 10 for each cylinder 2. The intake port 10 is provided with a plurality of intake valves 11. The intake valve 11 is actuated (opened and closed) by a variable intake valve mechanism 13. Here, the variable intake valve mechanism 13 includes a conventional variable valve timing (VVT) mechanism that changes the phase of an intake camshaft 12.

Each intake port 10 is connected to a common surge tank (intake manifold) 16. The surge tank 16 is provided with a boost-pressure sensor 17. The boost-pressure sensor 17 measures the pressure of air that is compressed by a compressor 24a, described below (hereinafter referred to as "compressed air"), which may be referred to as the boost pressure that is a pressure in an intake system.

An intake passage 18 is connected to the surge tank 16. A throttle valve 20 is provided in the intake passage 18. The throttle valve 20 is an electronically controlled valve that is driven by a throttle motor 21. The throttle valve 20 is driven based on an accelerator operation amount AA detected by an accelerator operation amount sensor 23 and the like. A throttle position sensor 22 that detects throttle opening amount TA is provided near the throttle valve 20. An intercooler 25 that cools the compressed air is provided upstream of the throttle valve 20.

The compressor 24a of a turbocharger 24 is provided upstream of the intercooler 25. The compressor 24a is coupled to a turbine 24b via a coupling shaft (not shown). The turbine 24b is provided in a first exhaust passage 32, which will be described later. The compressor 24a is rotationally driven as the turbine 24b is rotationally driven by a dynamic exhaust pressure (exhaust energy). An airflow meter 26 is provided upstream of the compressor 24a. The airflow meter 26 detects the intake air amount Ga.

The engine 1 is provided with a first exhaust valve 30A (may be denoted as "Ex1") and a second exhaust valve 30B (may be denoted as "Ex2") for each cylinder 2. The first exhaust valve 30A opens and closes the first exhaust passage 32 that is communicated with the turbine 24b. The turbine 24b is rotationally driven by the dynamic pressure of exhaust gas flowing through the first exhaust passage 32. Meanwhile, the second exhaust valve 30B opens and closes a second exhaust passage 34 that bypasses the turbine 24b.

These exhaust valves 30A and 30B are opened and closed by a variable exhaust valve mechanism 31. Here, the variable exhaust valve mechanism 31 is a mechanism that continuously changes the opening characteristics of the exhaust valves 30A and 30B of each cylinder 2. More specifically, the variable exhaust valve mechanism 31 includes a conventional VVT mechanism that can change the phase of an exhaust camshaft 29 in order to adjust the opening/closing timings of the exhaust valves 30A and 30B. In addition, the variable exhaust valve mechanism 31 includes a conventional variable lift (and duration) mechanism that can continuously change the lift and duration of the second exhaust valve 30B.

A first air-fuel ratio sensor 37 is provided in the first exhaust passage 32 to detect the air-fuel ratio of the exhaust gas flowing through the first exhaust passage 32. A three-way catalyst (S/C) 38 that purifies the exhaust gas is provided in a post-junction exhaust passage 36 downstream of the junction 35 of the first exhaust passage 32 and the second exhaust passage 34. In addition, a second air-fuel ratio sensor 39 is provided in the post-junction exhaust passage 36 downstream of the three-way catalyst 38 to detect the air-fuel ratio of the exhaust gas at that position.

The system according to the first embodiment includes an Electronic Control Unit (ECU) 40 as a control unit. The ECU 40 is connected at its input side with the coolant temperature sensor 3, the crank angle sensor 5, the boost-pressure sensor 17, the throttle position sensor 22, the accelerator operation amount sensor 23, the airflow meter 26, the first air-fuel ratio sensor 37, the second air-fuel ratio sensor 39, and the like. Meanwhile, the output side of the ECU 40 is connected with the injectors 6, the fuel pump 8, the variable intake valve mechanism 13, the throttle motor 21, the variable exhaust valve mechanism 31, and the like. The ECU 40 activates each actuator according to a specified program based on a signal received from each sensor to control the operating state of the engine 1.

Figure 2:
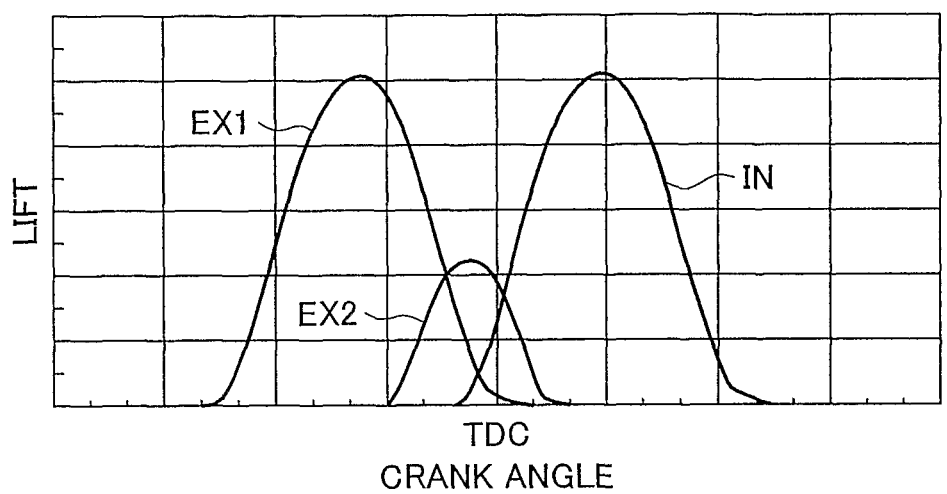
FIG. 2 is a graph that shows lift curves to illustrate valve timings of an intake valve and exhaust valves that are used in the first embodiment of the present invention.

FIG. 2 is a graph that shows lift curves to illustrate the intake valve and the exhaust valve timings that are used in this embodiment. More specifically, the valve timings of the intake valve and the exhaust valve that are shown in FIG. 2 are used to direct fresh air from the intake side to the exhaust side through an combustion chamber and to scavenge residual gas (internal EGR gas) in the cylinder. In such a case, as shown in FIG. 2, the variable exhaust valve mechanism 31 is used to retard the closing timing of the second exhaust valve Ex2 in comparison with that of the first exhaust valves Ex1. Accordingly, a valve overlap period, in which an opening period of the second exhaust valves Ex2 and that of the intake valve In overlap each other, is secured.

In addition, the opening timing of the second exhaust valve Ex2 is retarded in comparison with that of the first exhaust valve Ex1, and the lift of the second exhaust valve Ex2 is set smaller than that of the first exhaust valve Ex1. Accordingly, the amount of the exhaust energy that is supplied to the turbine 24b is increased, thereby immediately increasing the boost pressure.

According to the aforementioned valve timings of the intake valve and the exhaust valve, it is possible to effectively direct the fresh air from the intake side to the exhaust side (the second exhaust passage 34 side) when the boost pressure (surge tank pressure) is higher than the back pressure under high load. In addition, as shown in FIG. 2, the variable exhaust valve mechanism 31 adjusts the lift of the second exhaust valve Ex2. Thus, a fresh air flowing amount (scavenging amount) may be adjusted. Furthermore, in addition to or instead of controlling the second exhaust valve Ex2 with the variable exhaust valve mechanism 31, or instead of the control of the second exhaust valve Ex2, the opening timing of the intake valve 11 may be advanced to control the valve overlap period and thus to adjust the fresh air flowing amount.

Figure 3:
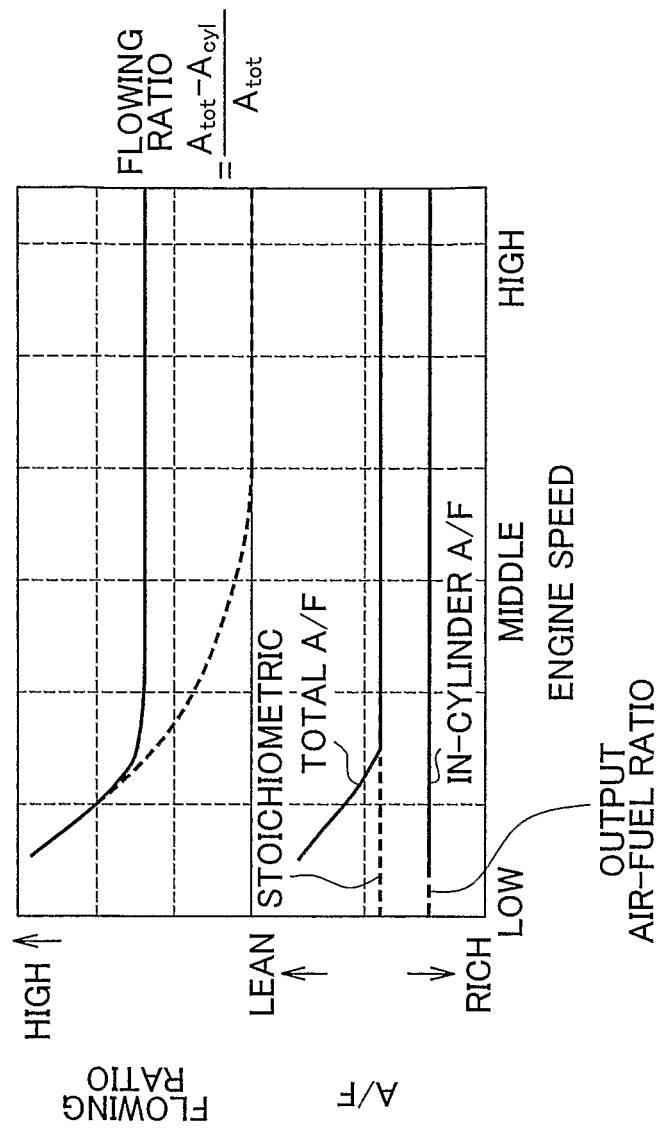
FIG. 3A and FIG. 3B illustrate characteristic air-fuel ratio control in the first embodiment of the present invention.

FIG. 3A and FIG. 3B are drawings that illustrate characteristic air-fuel ratio control in the first embodiment of the present invention. More specifically, FIG. 3A shows the relationship between a fresh air flowing ratio and the engine speed NE under high load (particularly under full load (WOT)), and FIG. 3B shows the relationship between an air-fuel ratio A/F and the engine speed NE under high load. As shown in FIG. 3A, the flow ratio means a proportion of a flown fresh air amount ($A_{tot}$-$A_{cyl}$) in the total amount of fresh air $A_{tot}$ that is drawn into the cylinder during one fuel loading (one fuel cycle of an internal combustion engine). $A_{cyl}$ is an amount of fresh air that is not flown to the exhaust side but is filled in the cylinder.

As described above, when the valve overlap period is provided in the turbocharged internal combustion engine, the fresh air flows from the intake side to the exhaust side through the combustion chamber when the boost pressure is higher than the back pressure under high load.

A dotted waveform in FIG. 3A shows a trend of the fresh air flowing ratio in a regular exhaust system that does not include the second exhaust passage 34, which bypasses the turbine 24b, in the exhaust system of this embodiment. As shown in FIG. 3A, in the regular exhaust system, the back pressure increases as the engine speed NE increases. Thus, the flowing ratio decreases.

Meanwhile, like the regular exhaust system, the back pressure in the first exhaust passage 32 that is communicated with the turbine 24b increases as the engine speed NE increases. However, because the back pressure in the second exhaust passage 34, which bypasses the turbine 24b, is not affected by exhaust resistance of the turbine 24b, the boost pressure remains higher than the back pressure in the second exhaust passage 34 even as engine speed NE increases. According to the exhaust system in this embodiment, the fresh air flowing amount is adjusted by the aforementioned control of the opening characteristic of the second exhaust valve Ex2. Therefore, as shown in the solid line in FIG. 3A, a desired flow ratio can be obtained in mid- to high-speed ranges.

Accordingly, the air-fuel ratio of gas that is filled in the cylinder (this may be hereinafter referred to as a "in-cylinder A/F") and an air-fuel ratio of gas that flows into the three-way catalyst 38 (this may be hereinafter referred to as a "total A/F") are controlled as described below when the engine is under high load by using the scavenging control that uses the fresh air flowing. According to the exhaust system in this embodiment, the scavenging control may be executed in a broad range of the engine speeds. In other words, as shown in FIG. 3B, the fuel injection amount is set so that the in-cylinder A/F approximates an output air-fuel ratio (12.5). In addition, the amount of the fresh air that flows through the second exhaust valve Ex2 is controlled by adjusting the opening characteristic of the second exhaust valve Ex2 so that the total A/F that contains the fresh air flowing through the cylinder approximates a theoretical air-fuel ratio (stoichiometry).

Figure 4:
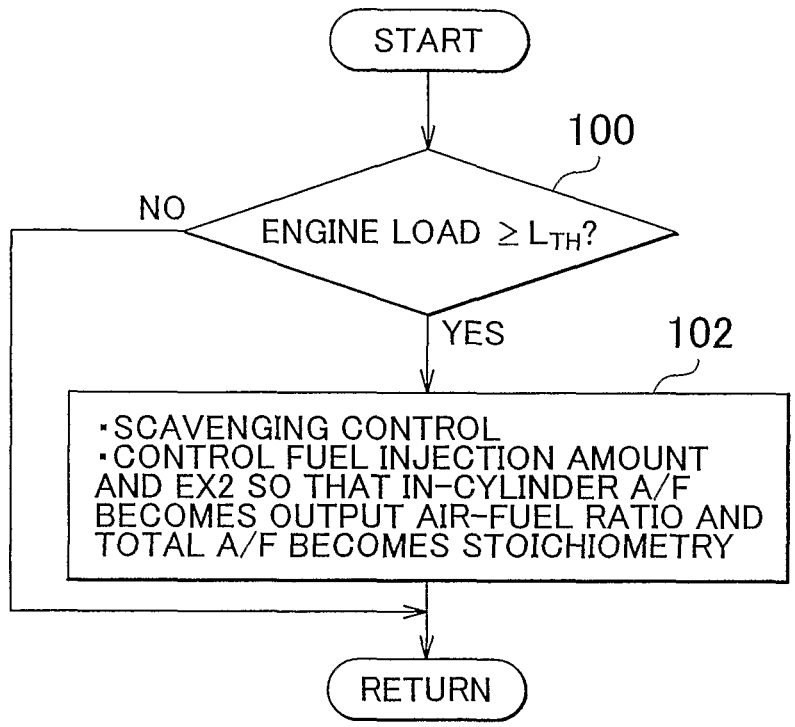
FIG. 4 is a flowchart of a routine that is executed in the first embodiment of the present invention.

FIG. 4 is a flowchart of a routine that is executed by the ECU 40 in the first embodiment in order to implement the above functions. In the routine shown in FIG. 4, the ECU 40 first determines whether a load on the engine 1 is equal to or higher than a threshold load $L_{TH}$ (step 100). More specifically, a determination is made based on the intake air amount Ga, the engine speed NE, and the like in this step. The threshold load $L_{TH}$ is set in advance as a value with which it is possible to determine whether the engine load is high enough to appropriately execute the scavenging control.

Consequently, if it is determined in step 100 that the current engine load is equal to or higher than the threshold load $L_{TH}$, or that the engine load is increased enough to appropriately execute the scavenging control, the air-fuel ratio control that accompanies the execution of the scavenging control is executed so that the in-cylinder A/F approximates the output air-fuel ratio and that the total A/F approximates the stoichiometry (step 102).

More specifically, in step 102, fuel is injected for a fuel injection amount F that is required to bring the in-cylinder A/F to the output air-fuel ratio. The fuel injection in this case, the fuel is injected at such timing that the fuel is not flown together with the fresh air upon the scavenging control (that is, timing after the second exhaust valve Ex2 is closed). In order to determine the fuel injection amount F in this case, the ECU 40 has stored a map (not shown) that defines the fuel injection amount F in relation to the operating state of the engine 1 (the engine load, the engine speed NE, and the like). In step 102, the ECU 40 refers to the map to compute the appropriate fuel injection amount F that yields the above in-cylinder A/F.

In addition, in step 102, an amount of the fresh air that flows through the second exhaust valves Ex2 ($A_{tot}-A_{cyl}$) is controlled by adjusting the opening characteristics of the second exhaust valve Ex2 so that the total A/F, which contains the fresh air that flows into the second exhaust passage 34, becomes stoichiometric. In order to determine the opening characteristic of the second exhaust valve Ex2 in this case, the ECU 40 refers to a stored map (not shown) that defines the opening characteristics of the second exhaust valve Ex2 (the opening/closing timing, the lift, and the duration) in relation to the operating state of the engine 1. In step 102, the map is used to compute the appropriate opening characteristics of the second exhaust valve Ex2 to obtain the above fresh air flowing amount ($A_{tot}-A_{cyl}$).

Moreover, in step 102, the fuel injection amount F is corrected based on an output of the first air-fuel ratio sensor 37 so that the in-cylinder A/F maintains a value close to the output air-fuel ratio. The first air-fuel ratio sensor 37 detects the air-fuel ratio of the exhaust gas flowing through the first exhaust passage 32, through which the fresh air does not flow, namely the in-cylinder A/F. Accordingly, feedback control of the in-cylinder A/F may be executed by using the output of the first air-fuel ratio sensor 37 to keep the in-cylinder A/F to the value that is close to the output air-fuel ratio.

Furthermore, in step 102, the fresh air flowing amount ($A_{tot}-A_{cyl}$) is corrected by adjusting the opening characteristics of the second exhaust valve Ex2 based on the output of the second air-fuel ratio sensor 39 so that the total A/F remains near stoichiometric. The second air-fuel ratio sensor 39 detects the air-fuel ratio of the exhaust gas after the exhaust gas that flows through the first exhaust passage 32 through which the fresh air does not flow joins the exhaust gas that flows through the second exhaust passage 34 through which the fresh air flows, namely the total A/F. Accordingly, feedback control of the total A/F may be executed by using the output of the second air-fuel ratio sensor 39 to keep the total A/F to the value that is close to stoichiometric.

According to the aforementioned routine that is shown in FIG. 4, the air-fuel ratio control that accompanies the execution of the scavenging control is executed when the engine is under high load so that the in-cylinder A/F approximates the output air-fuel ratio and that the total A/F approximates stoichiometric. With such air-fuel ratio control, the engine output can be maximized by bringing the in-cylinder A/F to the output air-fuel ratio. In addition, it is possible to obtain a good emission characteristic of the exhaust gas by bringing the air-fuel ratio of the gas that flows into the three-way catalyst 38 (the total A/F) to stoichiometric. As described above, according to the system in this embodiment, it is possible to simultaneously improve the engine output and reduce the exhaust emission under high load that requires the high engine output.

In addition, according to the above routine, the feedback control of the in-cylinder A/F and that of the total A/F are executed when the air-fuel ratio control is executed. Accordingly, it is possible to reliably, not accidentally, keep the in-cylinder A/F to the value close to the output air-fuel ratio, and it is also possible to reliably, not accidentally, keep the total A/F to the value close to stoichiometric.

In the first embodiment, the feedback control of the in-cylinder A/F and that of the total A/F are executed when the engine load is high. However, either one of or neither of these feedback controls may be executed in the present invention.

Also, in the first embodiment, the feedback control of the in-cylinder A/F is executed by adjusting the fuel injection amount while the feedback control of the total A/F is executed by adjusting the opening characteristics of the second exhaust valve Ex2. However, the aspects of these feedback controls in the present invention are not limited to the above. More specifically, the feedback control of the in-cylinder A/F may be executed by correcting the opening characteristics of the second exhaust valve Ex2 and thus by adjusting the fresh air flowing amount, for example. Meanwhile, the feedback control of the total A/F may be executed by adjusting the fuel injection amount.

In the above first embodiment, the turbocharger 24 corresponds to the "turbocharger" in the present invention, the turbine 24b corresponds to the "turbine" in the present invention, the first exhaust passage 32 corresponds to the "first exhaust passage" in the present invention, the first exhaust valve 30A corresponds to the "first exhaust valve" in the present invention, the second exhaust passage 34 corresponds to the "second exhaust passage" in the present invention, the second exhaust valve 30B corresponds to the "second exhaust valve" in the present invention, the post-junction exhaust passage 36 corresponds to the "post-junction exhaust passage" in the present invention, and the three-way catalyst 38 corresponds to the "catalyst" in the present invention. In addition, if the determination in step 100 is YES, the ECU 40 executes the process of step 102. Thus, the "scavenging control execution means" and the "air-fuel ratio control means" in the present invention are achieved. Moreover, the first air-fuel ratio sensor 37 corresponds to the "first air-fuel ratio sensor" in the present invention, and the second air-fuel ratio sensor 39 corresponds to the "second air-fuel ratio sensor" of the present invention. Furthermore, if the determination made in step 100 is YES, the ECU 40 executes the process of step 102. Thus, the "first air-fuel ratio feedback control execution means" and the "second air-fuel ratio feedback control execution means" in the present invention are achieved.

A second embodiment of the present invention will be described next with reference to FIG. 5 to FIG. 7. A system in this embodiment can be made with the hardware configuration shown in FIG. 1 and also with the ECU 40 that executes a routine shown in FIG. 7, which will be described later, instead of the routine shown in FIG. 4.

Figure 5:
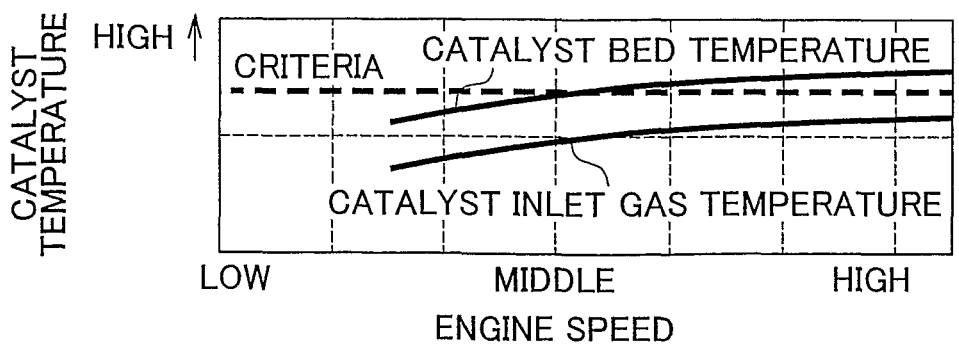
FIG. 5 is a graph that shows the relationship between a catalyst temperature and the engine speed NE under high load.

FIG. 5 is a graph that shows a relationship between the catalyst temperature and the engine speed NE when the engine is under high load. As shown in FIG. 5, as the engine speed NE increases, the amount of high-temperature exhaust gas that flows through the exhaust system increases. In addition, the exhaust pressure increases with an increase in the exhaust gas flowing amount. Accordingly, the exhaust gas that flows into the three-way catalyst 38 (catalyst inlet gas temperature) increases its temperature under high load. Consequently, as shown in FIG. 5, the bed temperature of the three-way catalyst 38 also increases as the engine speed NE increases.

Another reason for the increase in the catalyst temperature under high load and high speed is as follows. That is, like the above first embodiment, if the in-cylinder A/F is controlled to become the output air-fuel ratio that is richer than stoichiometric, and if the fresh air is flown, the fuel that becomes excessive during combustion in the cylinder and the fresh air that flows through the cylinder are supplied to the three-way catalyst 38. Here, the reason for the excessive fuel in the cylinder is because air-fuel mixture is combusted at an output air-fuel ratio that is richer than stoichiometric, at which the fuel and oxygen in the air are perfectly combusted.

Then, the excessive fuel and oxygen in the fresh air that flowed through the cylinder react the three-way catalyst 38 and thus cause the bed temperature of the three-way catalyst 38 to increase. Consequently, as shown in FIG. 5, the catalyst bed temperature exceeds an upper limit temperature threshold (criteria) in the high-speed range.

FIG. 6A to FIG. 6C are drawings that illustrate characteristic controls in the second embodiment of the present invention. More specifically, FIG. 6A shows the relationship between a fresh air flowing ratio and the engine speed NE when the engine is under high load, FIG. 6B shows a relationship between the air-fuel ratio A/F and the engine speed NE when the engine is under high load, and FIG. 6C shows a relationship between the catalyst temperature and the engine speed NE when the engine is under high load.

In the second embodiment, as shown in FIG. 6A, the scavenging control is executed if the engine speed NE is higher than a threshold engine speed NE1, and thus a desired flowing ratio can be secured. Then, as shown in FIG. 6B, if the engine speed NE is higher than the engine speed NE1, the air-fuel ratio control (control to bring the in-cylinder A/F to the output air-fuel ratio and the total A/F to stoichiometric) of the above first embodiment is executed.

Following the above, in the second embodiment, as shown in FIG. 6B, the difference between the in-cylinder A/F and the total A/F is set small in a region where the engine speed NE is higher than a threshold engine speed $NE_{TH}$ at which the excessive increase in the catalyst bed temperature is concerned in order to avoid increasing the catalyst bed temperature excessively when the engine is under a high-load and high-speed region during full throttle, a high-speed travel, or the like. More specifically, the in-cylinder A/F is brought close to the total A/F in this embodiment. In addition, the difference between the air-fuel ratios is set smaller as the engine speed NE increases.

In this embodiment, the air-fuel ratio difference is adjusted by adjusting the fresh air flowing amount (flowing ratio) and the fuel injection amount F. More specifically, the fresh air flowing amount ($A_{tot}$-$A_{cyl}$) is reduced by adjusting the opening characteristics of the second exhaust valve Ex2 while the amount of the air $A_{cyl}$ that is filled in the cylinder remains the same. In addition, the fuel injection amount F is reduced in proportion to the reduction in such flowing amount ($A_{tot}$-$A_{cyl}$).

According to the above method, as shown in FIG. 6B, because the fuel injection amount F is reduced in proportion to the reduction in the flowing amount ($A_{tot}$-$A_{cyl}$), the total A/F can be kept at stoichiometric. In addition, the fuel injection amount F is reduced while the amount of the air $A_{cyl}$ that is filled in the cylinder remains the same. Thus, it is possible to correct the in-cylinder A/F to the air-fuel ratio in the lean side (stoichiometric side) and thus to bring the in-cylinder A/F close to the total A/F. Therefore, the amount of the excessive fuel that is discharged from the cylinder can be reduced.

According to the above control, as shown in FIG. 6C, even if the air-fuel ratio control that accompanies the scavenging control is executed when the engine is under high load, the excessive fuel amount that is combusted in the three-way catalyst 38 is reduced. Thus, it is possible to suppress combustion of the excessive fuel amount in the three-way catalyst 38. Accordingly, it is possible to favorably prevent the increase in the catalyst bed temperature that exceeds the criteria. In addition, as shown in FIG. 6B, according to a method of reducing the difference between the air-fuel ratios by bringing the in-cylinder A/F close to the total A/F, the total A/F is constantly kept stoichiometric regardless of the increase and decrease in the engine speed NE under high load. Therefore, it is possible to prevent an excessive increase in the catalyst bed temperature even when prioritizing exhaust emission over the improvement of the output.

Figure 7:
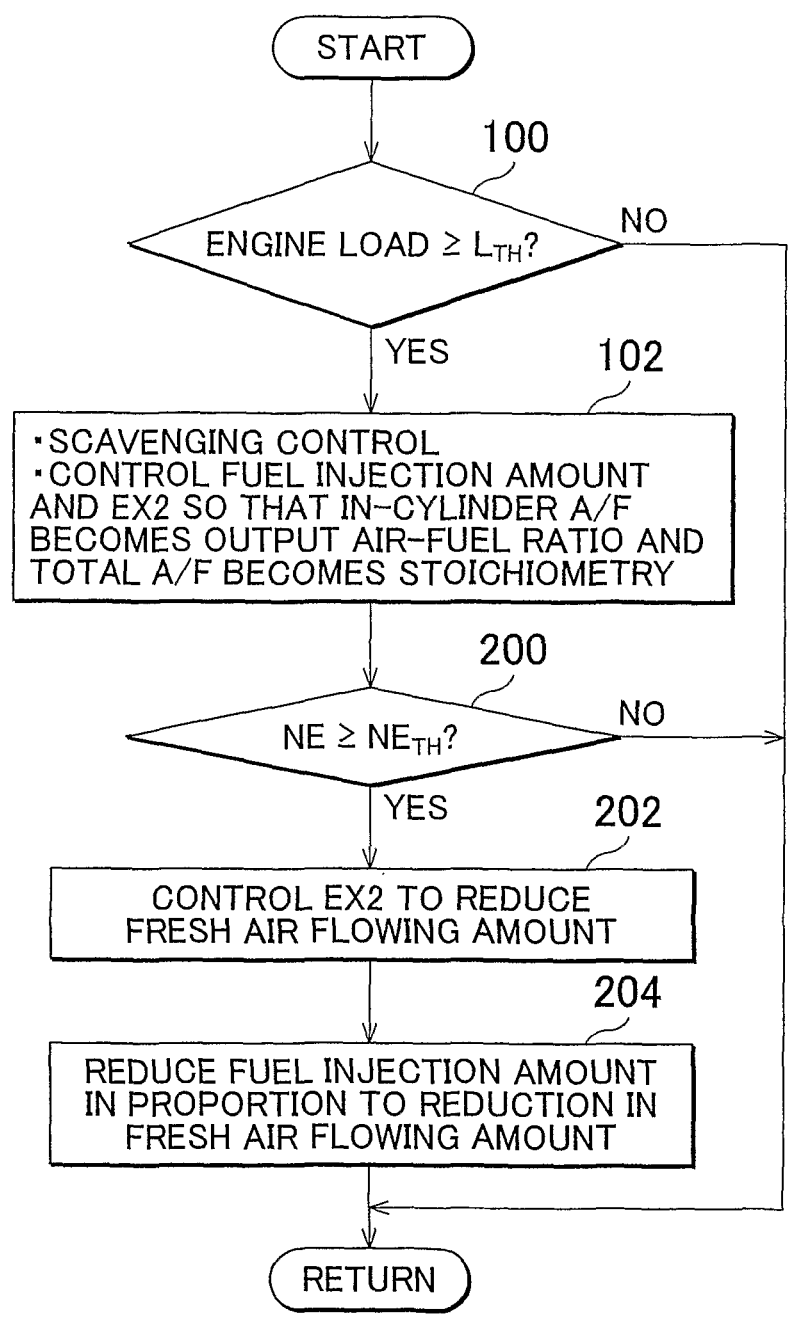
FIG. 7 is a flowchart of a routine that is executed in the second embodiment of the present invention.

FIG. 7 is a flowchart of a routine that is executed by the ECU 40 in the second embodiment in order to implement the above functions. It should be noted that, in FIG. 7, the same steps as those in FIG. 4 in the first embodiment are denoted by the same numerals and description thereof is omitted or simplified.

In the routine shown in FIG. 7, after the high-load air-fuel ratio control (the control to bring the in-cylinder A/F to the output air-fuel ratio and the total A/F to stoichiometric) is executed in step 102, it is determined whether the current engine speed NE is equal to or higher than the threshold engine speed $NE_{TH}$ (step 200). The threshold engine speed $NE_{TH}$ is set in advance and used to determine whether the engine speed NE falls within a speed range in which the excessive increase in the catalyst bed temperature is concerned by executing the air-fuel ratio control that accompanies the scavenging control.

As a result, in step 200, if it is determined that the current engine speed NE is equal to or higher than the threshold engine speed $NE_{TH}$, or if it is determined that the engine speed NE is in the speed region in which the excessive increase in the catalyst bed temperature is concerned, processing is executed to bring the in-cylinder A/F close to the total A/F (in steps 202 and 204) so that the difference between the in-cylinder A/F and the total A/F is reduced.

In step 202, the fresh air flowing amount $(A_{tot}\text{-}A_{cyl})$ is reduced by adjusting the opening characteristics of the second exhaust valve Ex2 (the opening/closing timing, the lift, and the duration) while preventing a change in the amount of the air $A_{cyl}$ that is filled in the cylinder. Accordingly, the total amount of the air $A_{tot}$ that flows into the three-way catalyst 38 is reduced.

Next, in step 204, the fuel injection amount F is reduced in proportion to the reduction in the fresh air flowing amount $(A_{tot}\text{-}A_{cyl})$ in step 202.

According to the aforementioned routine that is shown in FIG. 7, as it has been described with reference to FIG. 6C, even if the air-fuel ratio control that accompanies the scavenging control is executed when the engine 1 is under high load, it is possible to prevent an excessive increase in the catalyst bed temperature while the exhaust emission reduction is prioritized over the output improvement.

In the above second embodiment, the ECU 40 executes the processes of steps 202 and 204 if the determination in step 200 YES; therefore, the "air-fuel ratio difference control means" in the present invention is achieved. In addition, the ECU 40 executes the processes of steps 202 and 204 when the determination is true in step 200; therefore, the "emission priority air-fuel ratio difference control means" in the present invention is achieved.

A third embodiment of the present invention will now be described with reference to FIG. 8A to FIG. 9. A system of this embodiment may be made with the hardware configuration shown in FIG. 1 and also with the ECU 40 that executes a routine shown in FIG. 9, which will be described later, instead of the routine shown in FIG. 7.

FIG. 8A to FIG. 8C are drawings that illustrate characteristic control in the third embodiment of the present invention. More specifically, FIG. 8A shows the relationship between the fresh air flowing ratio and the engine speed NE under high load, FIG. 8B shows a relationship between the air-fuel ratio (A/F) and the engine speed NE under high load, and FIG. 8C shows a relationship between the catalyst temperature and the engine speed NE under high load.

Also, in this embodiment, as shown in FIG. 8A, the scavenging control is executed when the engine speed NE exceeds the threshold engine speed NE1 so as to secure a desired flowing ratio. Then, as shown in FIG. 8B, in the region where the engine speed NE exceeds the engine speed NE1, the air-fuel ratio control in the above first embodiment (the control to bring the in-cylinder A/F to the output air-fuel ratio and the total A/F to stoichiometric) is executed.

Following the above, in this embodiment, as shown in FIG. 8B, the difference between the in-cylinder A/F and the total A/F is set small in a region where the engine speed NE exceeds the threshold engine speed $NE_{TH}$ at which the excessive increase in the catalyst bed temperature is concerned in order to avoid excessively increasing the catalyst bed temperature in the high-load, and when the engine speed NE falls within the high-speed region, such as during the full throttle and during the high-speed travel. In contrast to the second embodiment, the total A/F is brought close to the in-cylinder A/F in this embodiment. In addition, the difference between the air-fuel ratios is reduced as the engine speed NE increases.

In addition, in this embodiment, unlike the above second embodiment, the air-fuel ratio difference is adjusted by adjusting only the fresh air flowing amount (flowing ratio). In other words, the fuel injection amount F is held constant while adjusting the air-fuel ratio difference, and then the amount of the air $A_{cyl}$ that is filled in the cylinder is kept constant. In addition, the fresh air flowing amount $(A_{tot}\text{-}A_{cyl})$ is reduced by adjusting the opening characteristics of the second exhaust valve Ex2.

According to such a method, as shown in FIG. 8B, the fresh air flowing amount $(A_{tot}\text{-}A_{cyl})$ is reduced while the amount of the air $A_{cyl}$ that is filled in the cylinder and the fuel injection amount F are held constant. Accordingly, it is possible to correct the total A/F to the air-fuel ratio in the rich side while the in-cylinder A/F remains at the output air-fuel ratio. As a result, the total A/F can be brought close to the in-cylinder A/F. Therefore, it is possible to reduce the excessive amount of the fresh air $(A_{tot}\text{-}A_{cyl})$ that flows through the cylinders.

According to the above control, as shown in FIG. 8C, even if the air-fuel ratio control that accompanies the scavenging control is executed when the engine is under high load, an excessive amount of fresh air (oxygen amount) used to react with the excessive fuel amount in the three-way catalyst 38 is reduced. Accordingly, it is possible to suppress combustion of the excessive fuel amount in the three-way catalyst 38. Therefore, it is possible to prevent the catalyst bed temperature from exceeding an upper limit temperature threshold. In addition, as shown in FIG. 8B, according to a method of reducing the difference between the air-fuel ratios by bringing the total A/F close to the in-cylinder A/F, the in-cylinder A/F is constantly kept at the output air-fuel ratio regardless of the increase and decrease in the engine speed NE under high load. Therefore, it is possible to prevent an excessive increase in the catalyst bed temperature while the output improvement is prioritized over the exhaust emission reduction.

FIG. 9 is a flowchart of a routine that is executed by the ECU 40 in the third embodiment to implement the above functions. It should be noted that, in FIG. 9, the same steps as those in FIG. 7 in the first embodiment are denoted by the same numerals and description thereof is omitted or simplified.

In the routine shown in FIG. 9, if it is determined in step 200 that the current engine speed NE is equal to or higher than the threshold engine speed $NE_{TH}$, or if it is determined that the engine speed NE is in the speed range in which the excessive increase in the catalyst bed temperature is concerned, processing is executed to bring the total A/F close to the in-cylinder A/F (step 300) in order to reduce the difference between the in-cylinder A/F and the total A/F.

In step 300, the fresh air flowing amount $(A_{tot}\text{-}A_{cyl})$ is reduced by adjusting the opening characteristics of the second exhaust valve Ex2 (the opening/closing timing, the lift, and the duration) while the amount of the air $A_{cyl}$ that is filled in the cylinder and the fuel injection amount F remains constant. Accordingly, the total amount of the air $A_{tot}$ that flows into the three-way catalyst 38 is reduced.

According to the above routine that is shown in FIG. 9, as it has been described with reference to FIG. 8C, even if the air-fuel ratio control that accompanies the scavenging control is executed while the engine 1 operates in the high load region, it is possible to prevent an excessive increase in the catalyst bed temperature under high load while prioritizing output improvement over the exhaust emission reduction.

In the above third embodiment, the ECU 40 executes the process of step 300 if the determination is true in step 200; therefore, the "air-fuel ratio difference control means" in the present invention is achieved. In addition, the ECU 40 executes the process of step 300 if the determination is true in step 200; therefore, the "output priority air-fuel ratio difference control means" in the present invention is achieved.

Here, in the above first to third embodiments, the second air-fuel ratio sensor 39 that detects the total A/F is provided downstream of the three-way catalyst 38. However, the location of the second air-fuel ratio sensor in the present invention is not limited to the above location but may be upstream of the catalyst (three-way catalyst 38) in the post-junction exhaust passage (post-junction exhaust passage 36), for example. In addition, the second air-fuel ratio sensor may located either upstream or downstream of the catalyst in the post-junction exhaust passage.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A control unit for a turbocharged internal combustion engine, comprising:
a turbocharger that compresses intake air;
a first exhaust passage that is communicated with a turbine of the turbocharger; a first exhaust valve that opens and closes the first exhaust passage;
a second exhaust passage that bypasses the turbine; a second exhaust valve that opens and closes the second exhaust passage;
a post-junction exhaust passage which joins the first exhaust passage and the second exhaust passage;
a catalyst that is arranged in the post-junction exhaust passage and purifies exhaust gas;
a first air-fuel ratio sensor that is provided in the first exhaust passage to detect an air-fuel ratio of exhaust gas in the first exhaust passage;
a second air-fuel ratio sensor that is provided either upstream or downstream of the catalyst in the post-junction exhaust passage to detect an air-fuel ratio of exhaust gas in the post-junction exhaust passage,
an electronic control unit programmed to include a scavenging control execution section that controls at least one of a closing timing of the second exhaust valve and an opening timing of an intake valve to secure a valve overlap period between an opening period of the second exhaust valve and an opening period of the intake valve when the internal combustion engine operates under high load, and the electronic control unit is programmed to include an air-fuel ratio control section that controls an air-fuel ratio of gas that is filled in a cylinder to an output air-fuel ratio and that controls the air-fuel ratio of gas flowing into the catalyst to a theoretical air-fuel ratio when the internal combustion engine operates under high load,
wherein the air-fuel ratio control section of the electronic control unit includes
a first air-fuel ratio feedback control execution section that controls to keep the air-fuel ratio of gas that is filled in the cylinder to the output air-fuel ratio based on the output of the first air-fuel ratio sensor, and
a second air-fuel ratio feedback control execution section that controls to keep the air-fuel ratio of gas flowing into the catalyst to the theoretical air-fuel ratio based on the output of the second air-fuel ratio sensor.

2. The control unit for a turbocharged internal combustion engine according to claim 1, wherein the first air-fuel ratio feedback control execution section and the second air-fuel ratio feedback control execution section execute feedback control to adjust at least one of a fuel injection amount and an opening characteristic of the second exhaust valve.

3. The control unit for a turbocharged internal combustion engine according to claim 2, wherein the opening characteristic of the second exhaust valve is changed based on at least one of a valve timing, a lift, and a duration of the second exhaust valve.

4. The control unit for a turbocharged internal combustion engine according to claim 1, wherein
the first air-fuel ratio feedback control execution section executes the feedback control to adjust a fuel injection amount, and
the second air-fuel ratio feedback control execution section executes the feedback control to adjust an opening characteristic of the second exhaust valve.

5. The control unit for a turbocharged internal combustion engine according to claim 4, wherein the opening characteristic of the second exhaust valve is changed based on at least one of a valve timing, a lift, and a duration of the second exhaust valve.

6. The control unit for a turbocharged internal combustion engine according to claim 1, wherein the air-fuel ratio control section includes an air-fuel ratio difference control section that controls at least one of the air-fuel ratio of gas that is filled in the cylinder and the air-fuel ratio of gas that flows into the catalyst to reduce an air-fuel ratio difference between the air-fuel ratio of gas that is filled in the cylinder and the air-fuel ratio of gas flowing into the catalyst when an engine speed is equal to or higher than a threshold engine speed.

7. The control unit for a turbocharged internal combustion engine according to claim 6, wherein the air-fuel ratio difference control section includes an emission priority air-fuel ratio difference control section that adjusts the opening characteristic of the second exhaust valve and a fuel injection amount so that the air-fuel ratio of gas that is filled in the cylinder is in accordance with the air-fuel ratio of gas that flows into the catalyst when the air-fuel ratio difference is reduced.

8. The control unit for a turbocharged internal combustion engine according to claim 7, wherein the air-fuel ratio difference control section adjusts the opening characteristic of the second exhaust valve to retain the amount of air that is filled in the cylinder and to reduce a fresh air flowing amount, and also reduces the fuel injection amount in proportion to a reduction in the fresh air flowing amount.

9. The control unit for a turbocharged internal combustion engine according to claim 6, wherein the air-fuel ratio difference control section includes an output priority air-fuel ratio difference control section that adjusts the opening characteristic of the second exhaust valve so that the air-fuel ratio of gas that flows into the catalyst is in accordance with the air-fuel ratio of gas that is filled in the cylinder when the air-fuel ratio difference is reduced.

10. The control unit for a turbocharged internal combustion engine according to claim 9, wherein the air-fuel ratio difference control section adjusts the opening characteristic of the second exhaust valve to reduce the fresh air flowing amount while retaining the amount of air that is filled in the cylinder and the fuel injection amount.

11. A control method for a turbocharged internal combustion engine, the internal combustion engine with a turbocharger including: a turbocharger that compresses intake air; a first exhaust passage that is communicated with a turbine of the turbocharger; a first exhaust valve that opens and closes the first exhaust passage; a second exhaust passage that bypasses the turbine; a second exhaust valve that opens and closes the second exhaust passage; a post-junction exhaust passage which joins the first exhaust passage and the second exhaust passage; and a catalyst that is arranged in the post-junction exhaust passage and purifies exhaust gas, the control method for the turbocharged internal combustion engine comprising:

controlling at least one of a closing timing of the second exhaust valve and an opening timing of an intake valve to secure a valve overlap period between an opening period of the second exhaust valve and an opening period of the intake valve when the internal combustion engine operates under high load;

controlling to bring an air-fuel ratio of gas that is filled in a cylinder to an output air-fuel ratio and to bring an air-fuel ratio of gas flowing into the catalyst to a theoretical air-fuel ratio when the internal combustion engine operates under high load;

detecting the air-fuel ratio of exhaust gas in the first exhaust passage;

detecting the air-fuel ratio of exhaust gas in the post-junction exhaust passage;

controlling to keep the air-fuel ratio of gas that is filled in the cylinder to the output air-fuel ratio based on the output of the first air-fuel ratio sensor; and controlling to keep the air-fuel ratio of gas flowing into the catalyst to the theoretical air-fuel ratio based on the output of the second air-fuel ratio sensor.

\* \* \* \* \*